United States Patent
Yoshida et al.

(10) Patent No.: US 10,153,478 B2
(45) Date of Patent: Dec. 11, 2018

(54) SECONDARY BATTERY

(71) Applicant: SANYO Electric Co., Ltd., Daito-shi, Osaka (JP)

(72) Inventors: Shinichirou Yoshida, Hyogo (JP); Eiji Okutani, Hyogo (JP); Takuya Yamawaki, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 15/664,232

(22) Filed: Jul. 31, 2017

(65) Prior Publication Data

US 2018/0076440 A1 Mar. 15, 2018

(30) Foreign Application Priority Data

Sep. 9, 2016 (JP) .................................. 2016-176271

(51) Int. Cl.
*H01M 2/34* (2006.01)
*H01M 2/02* (2006.01)
*H01M 2/30* (2006.01)

(52) U.S. Cl.
CPC ......... *H01M 2/345* (2013.01); *H01M 2/0237* (2013.01); *H01M 2/0217* (2013.01); *H01M 2/305* (2013.01); *H01M 2200/20* (2013.01)

(58) Field of Classification Search
CPC .... H01M 2/345; H01M 2/0237; H01M 2/305; H01M 2/0217; H01M 2200/20
See application file for complete search history.

(56) References Cited

U.S. PATENT DOCUMENTS

| | | |
|---|---|---|
| 2008/0038627 A1 | 2/2008 | Yamauchi et al. |
| 2013/0196185 A1* | 8/2013 | Yokoyama .............. H01M 2/06 429/53 |
| 2013/0196220 A1* | 8/2013 | Okutani .............. H01M 2/0217 429/179 |
| 2015/0079432 A1* | 3/2015 | Okuda .................. H01M 2/345 429/61 |
| 2016/0233480 A1 | 8/2016 | Fukushi |
| 2016/0308190 A1* | 10/2016 | Okuda ................... H01G 11/14 |

FOREIGN PATENT DOCUMENTS

JP 2013-157099 A 8/2013

* cited by examiner

*Primary Examiner* — Stewart A Fraser
(74) *Attorney, Agent, or Firm* — Westerman, Hattori, Daniels & Adrian, LLP

(57) ABSTRACT

A battery includes a battery case, an electrode assembly, positive and negative electrode collectors, a sealing body, an external terminal, a conducting member, a deforming plate, and a first insulating member. The positive or negative electrode collector has a base portion facing the first insulating member, and a lead portion connected to the electrode assembly. A fixing portion fixing the base portion and the first insulating member to each other is provided in the first insulating member. The fixing portion is located nearer to the connection portion between the deforming plate and the positive or negative electrode collector than the sealing body side support position of the first insulating member. The outer peripheral edge of the electrode assembly side surface of the first insulating member is provided with a rib protruding to the electrode assembly side and extending along the outer peripheral edge of the base portion.

8 Claims, 7 Drawing Sheets

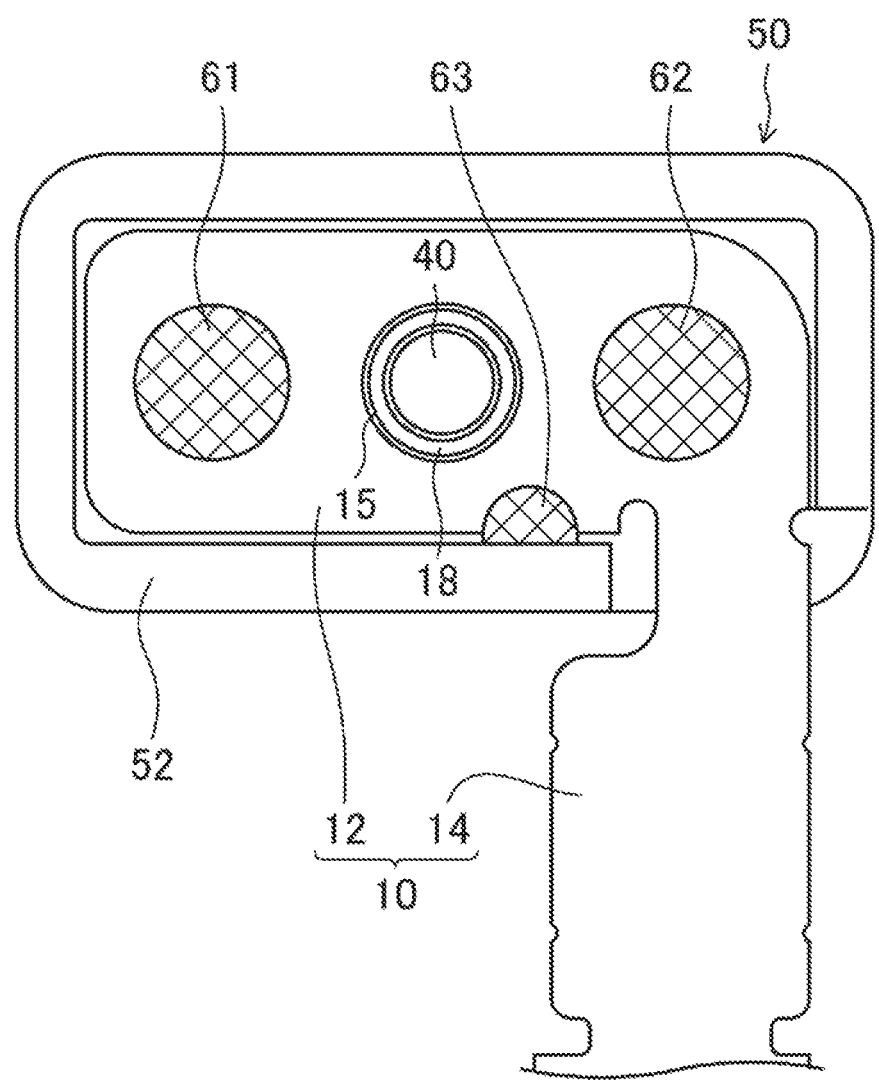

SECONDARY BATTERY

CROSS REFERENCE TO RELATED APPLICATIONS

The present invention application claims priority to Japanese Patent Application No. 2016-176271 filed in the Japan Patent Office on Sep. 9, 2016, the entire contents of which are incorporated herein by reference.

BACKGROUND OF THE INVENTION

Field of the Invention

The present invention relates to a secondary battery.

Description of Related Art

Alkaline secondary batteries and nonaqueous electrolyte secondary batteries are used as power supplies for driving electric vehicles (EVs) and hybrid electric vehicles (HEVs, PHEVs) and in stationary storage battery systems for suppressing the variation in output power of photovoltaic generation, wind power generation, and the like, and for peak shifts in system power in order to store electric power during the night time and to use the electric power during daytime.

A battery used for such a purpose is provided not only with a gas release valve that releases internal pressure when the pressure in the battery outer packaging increases but also with a current breaking mechanism that breaks the electrical connection between an external terminal and an electrode assembly inside the outer packaging as shown, for example, in Japanese Published Unexamined Patent Application No. 2013-157099 (Patent Document 1).

In the art disclosed in Patent Document 1, in a positive electrode collector or a negative electrode collector that makes up a current breaking mechanism, and a second insulating member, a first opening, a second opening, and at least one third opening or cutout formed in the positive electrode collector or the negative electrode collector, and protrusions formed on the second insulating member are engaged with each other.

In Patent Document 1, the second insulating member and a lower first insulating member are engaged with and fixed to each other in a latching manner.

The second insulating member can be made of a softer resin material. For example, when the second insulating member is made of a softer resin material, the damage or breakage of the second insulating member can be prevented when connecting the second insulating member and the lower first insulating member. However, the inventors found that, when the second insulating member is soft, there is the following new problem.

The positive electrode collector or the negative electrode collector is connected to an inversion plate. The positive electrode collector is connected to a positive electrode plate, and the negative electrode collector is connected to a negative electrode plate. A fixing portion in which the positive electrode collector or the negative electrode collector and the second insulating member are fixed is provided. For this reason, the weight of the electrode assembly including the positive electrode plate and the negative electrode plate is applied to the second insulating member through the positive electrode collector or the negative electrode collector.

The second insulating member is connected to the lower first insulating member, and is supported on the sealing body side. The fixing portion in which the positive electrode collector or the negative electrode collector and the second insulating member are fixed is located nearer to the connection portion between the positive electrode collector or the negative electrode collector and the inversion plate than the connection portion between the second insulating member and the lower first insulating member. Therefore, when the second insulating member is made of a soft material, the second insulating member may deformed by the weight of the electrode assembly. When the second insulating member is deformed, the state of the connection portion between the positive electrode collector or the negative electrode collector and the inversion plate changes, and therefore a phenomenon occurs in which the current breaking mechanism does not operate normally.

Such a problem can arise not only when the second insulating member is made of a soft resin material but also when the second insulating member has a small thickness or when the weight of the electrode assembly is very great.

BRIEF SUMMARY OF THE INVENTION

It is a main object of the present invention to provide a secondary battery in which a current breaking mechanism operates normally.

In an aspect of the present invention, a secondary battery includes a bottomed tubular battery case having an opening, an electrode assembly housed in the battery case and including a positive electrode and a negative electrode, a positive electrode collector electrically connected to the positive electrode, a negative electrode collector electrically connected to the negative electrode, a sealing body sealing the opening of the battery case, an external terminal exposed to the outside in the sealing body, a conducting member located between the sealing body and the electrode assembly, electrically connected to the external terminal, and having a tubular portion, a deforming plate located between the conducting member and the electrode assembly, sealing the opening of the tubular portion, electrically connected to the conducting member, electrically connected to the positive electrode collector or the negative electrode collector, and deforming when the pressure in the battery case reaches a predetermined value and thereby breaking the electrical connection with the positive electrode collector or the negative electrode collector, and a first insulating member located between the deforming plate and the positive electrode collector or the negative electrode collector and supported on the sealing body side. A conduction route is formed in the order of the electrode assembly, the positive electrode collector or the negative electrode collector, the deforming plate, the conducting member, and the external terminal. The positive electrode collector or the negative electrode collector has a base portion facing the first insulating member, and a lead portion extending from an end of the base portion and connected to the electrode assembly. At least one fixing portion fixing the base portion and the first insulating member to each other is provided in the first insulating member. The at least one fixing portion is located nearer to the connection portion between the deforming plate and the positive electrode collector or the negative electrode collector than the sealing body side support position of the first insulating member. The outer peripheral edge of the electrode assembly side surface of the first insulating member is provided with a rib protruding to the electrode assembly side and extending along the outer peripheral edge of the base portion.

It is preferable that the first insulating member be made of a resin having a Young's modulus of 1500 MPa or less.

It is preferable that, in the first insulating member, the rib extend on both sides of the lead portion along the outer peripheral edge of the base portion.

It is preferable that the weight of the electrode assembly be 100 g or more and that the thickness of a part of the first insulating member that is located between the deforming plate and the base portion be 1.0 mm or less.

It is preferable that the at least one fixing portion comprise at least three fixing portions.

It is preferable that the first insulating member have a first fixing portion, a second fixing portion, and a third fixing portion as the at least one fixing portion and that, between the first fixing portion and the second fixing portion, the base portion of the positive electrode collector or the negative electrode collector be electrically connected to the deforming plate and that the third fixing portion be disposed on the outer peripheral edge of the base portion and in the vicinity of the lead portion.

It is preferable that the at least one fixing portion be at least one protrusion provided on the first insulating member and that the at least one protrusion be fitted in at least one opening or cutout provided in the base portion of the positive electrode collector or the negative electrode collector, and the first insulating member and the positive electrode collector or the negative electrode collector be thereby fixed to each other.

It is preferable that a second insulating member be disposed between the sealing body and the tubular portion of the conducting member and that the first insulating member and the second insulating member be connected to each other.

Since, in the secondary battery of the present invention, a rib is provided on the outer peripheral edge of the first insulating member, the current breaking mechanism can be prevented from operating abnormally.

BRIEF DESCRIPTION OF THE SEVERAL VIEWS OF THE DRAWINGS

FIG. 7 is a schematic view of the positive electrode collector before bending and the first insulating member of the current breaking mechanism according to the embodiment as seen from the electrode assembly side.

DETAILED DESCRIPTION OF THE INVENTION

Figure 1:
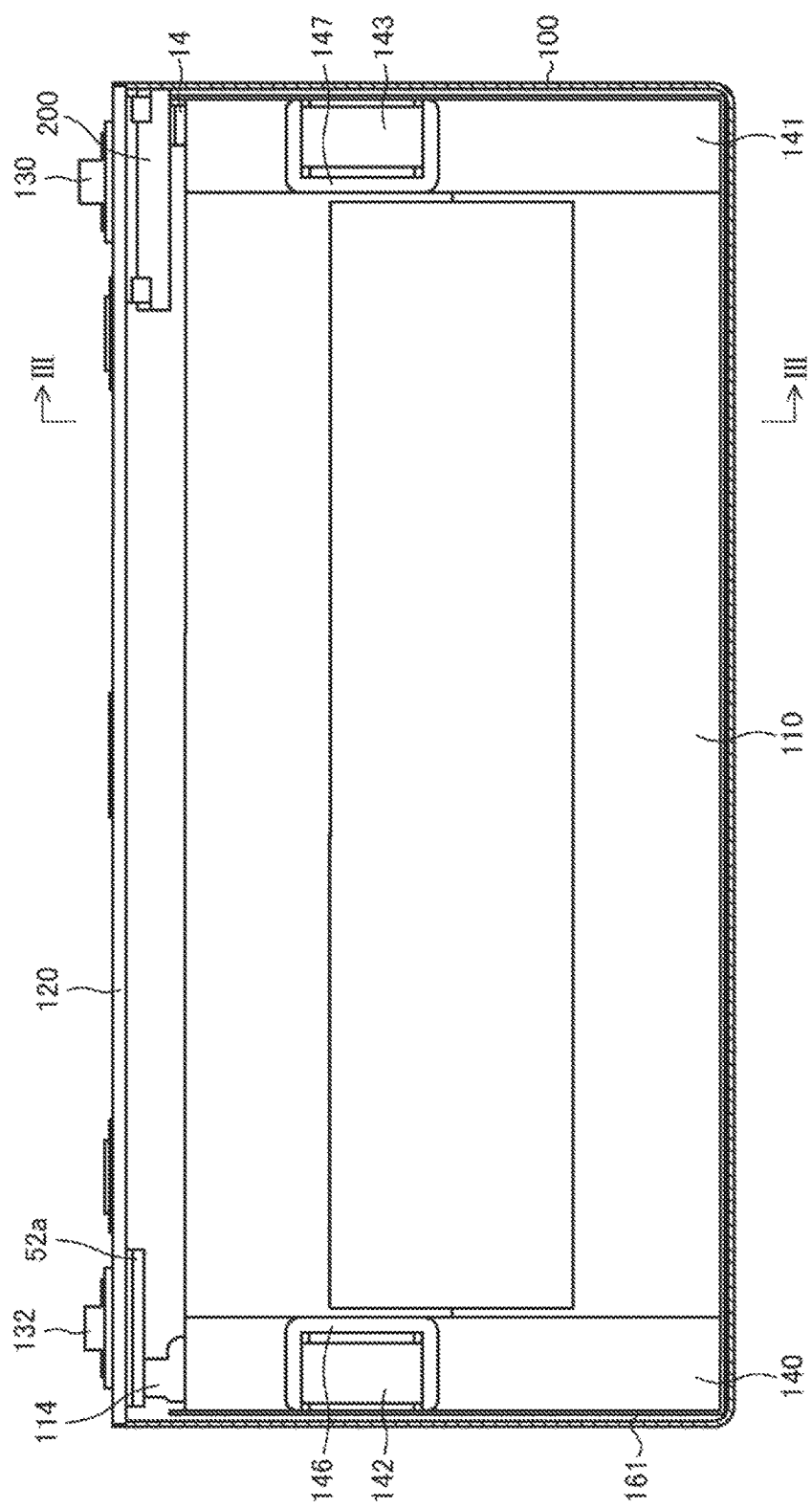
FIG. 1 is a schematic front view showing the inside of a battery according to the embodiment, with the front part of a battery case and the front part of an insulating sheet removed.
Figure 2:
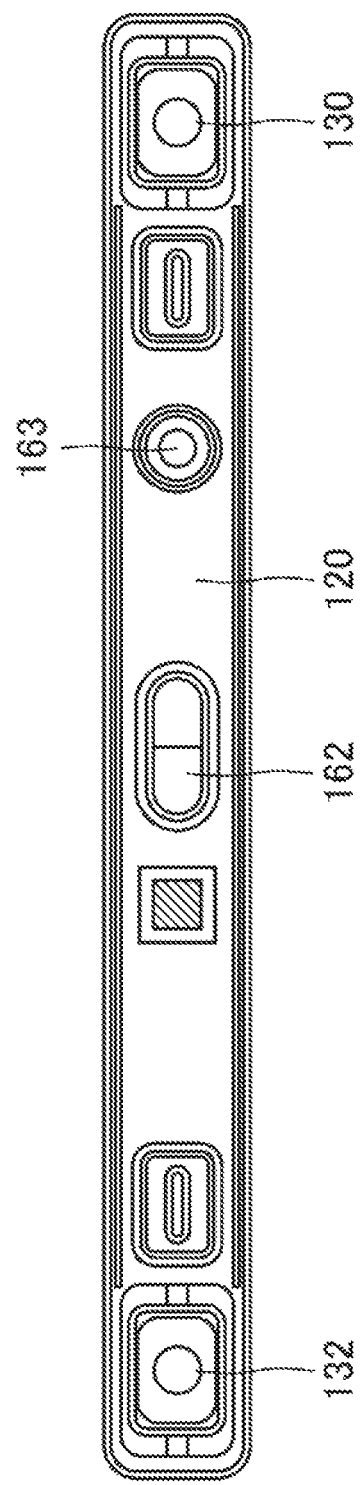
FIG. 2 is a schematic top view of the battery according to the embodiment.
Figure 3:
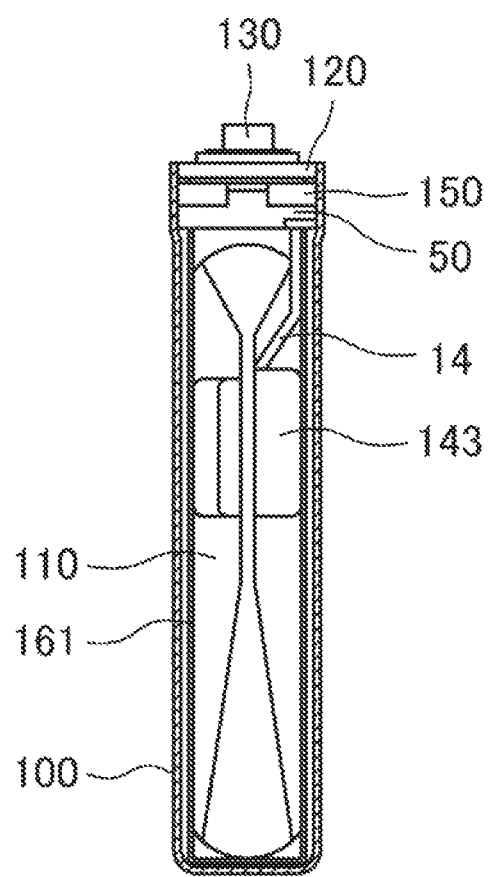
FIG. 3 is a schematic side view showing the positive electrode side of the inside of the battery according to the embodiment, with the side (positive electrode side) part of the battery case and the side (positive electrode side) part of the insulating sheet removed.
Figure 4:
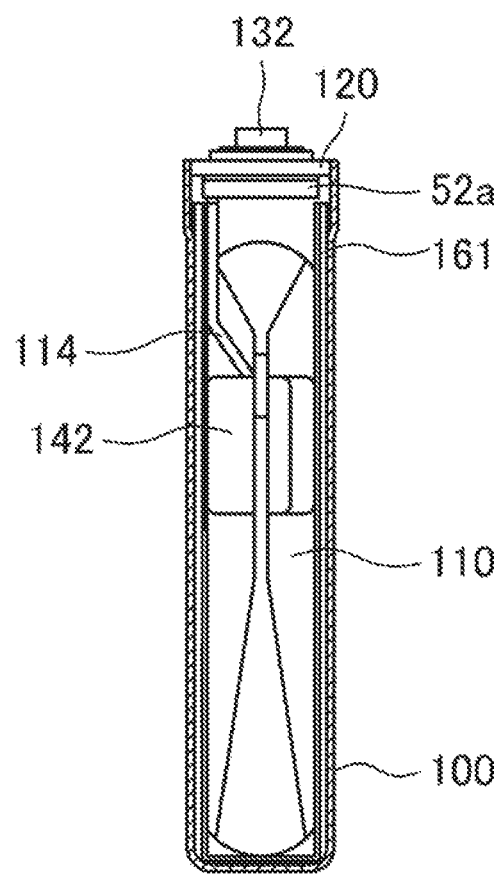
FIG. 4 is a schematic side view showing the negative electrode side of the inside of the battery according to the embodiment, with the side (negative electrode side) part of the battery case and the side (negative electrode side) part of the insulating sheet removed.

Embodiments of the present invention will be described in detail with reference to the drawings. The following description of the preferred embodiments is merely exemplary in nature, and is in no way intended to limit the invention, its application, or uses. In the following drawings, components having substantially the same functions will be designated by the same reference numerals in order to simplify the illustration.

Embodiment

First, a secondary battery of the embodiment will be described with reference to FIGS. 1 to 4. The secondary battery of the embodiment has a flat electrode assembly 110 in which a positive electrode plate (not shown) and a negative electrode plate (not shown) are rolled with a separator (not shown) interposed therebetween. The weight of the electrode assembly 110 exceeds 100 g. The positive electrode plate that makes up the positive electrode is made by applying a positive electrode active material mixture to both sides of a positive electrode substrate composed of an aluminum foil, drying and rolling, and then slitting such that the aluminum foil is exposed at one end, along the longitudinal direction, in a belt-like shape. The negative electrode plate that makes up the negative electrode is made by applying a negative electrode active material mixture to both sides of a negative electrode substrate composed of a copper foil, drying and rolling, and then slitting such that the copper foil is exposed at one end, along the longitudinal direction, in a belt-like shape.

The positive electrode plate and negative electrode plate obtained in the foregoing manner are shifted from each other so that a part of the positive electrode plate where the positive electrode substrate is exposed and a part of the negative electrode plate where the negative electrode substrate is exposed do not overlap with their opposing electrodes, and are laminated and rolled with a microporous separator made of polypropylene and polyethylene interposed therebetween. A positive electrode substrate exposed portion 141 is formed at one end in the rolling axis direction of the electrode assembly 110, and a negative electrode substrate exposed portion 140 is formed at the other end in the rolling axis direction of the electrode assembly 110.

The positive electrode substrate exposed portion 141 is electrically connected to a positive electrode terminal 130 through a positive electrode collector. A lead portion 14 of the positive electrode collector is connected by welding to a first outer surface of the positive electrode substrate exposed portion 141. A receiving member 143 of the positive electrode collector is connected by welding to a second outer surface of the positive electrode substrate exposed portion 141. An insulating film having an opening is disposed between the first outer surface of the positive electrode substrate exposed portion 141 and the lead portion 14 of the positive electrode collector. The positive electrode substrate exposed portion 141 and the lead portion 14 of the positive electrode collector are connected by welding to each other through the opening of the insulating film. An insulating film 147 having an opening is disposed between the second outer surface of the positive electrode substrate exposed portion 141 and the receiving member 143 of the positive electrode collector. The positive electrode substrate exposed portion 141 and the receiving member 143 of the positive electrode collector are connected by welding to each other through the opening of the insulating film 147.

The positive electrode collector is electrically insulated from the sealing plate (sealing body) 120 by a first insulating member 50 and a second insulating member 150.

The negative electrode substrate exposed portion 140 is electrically connected to a negative electrode terminal 132 through a negative electrode collector. A lead portion 114 of the negative electrode collector is connected by welding to a first outer surface of the negative electrode substrate exposed portion 140. A receiving member 142 of the negative electrode collector is connected by welding to a second outer surface of the negative electrode substrate exposed portion 140. An insulating film having an opening is disposed between the first outer surface of the negative electrode substrate exposed portion 140 and the lead portion 114 of the negative electrode collector. The negative electrode substrate exposed portion 140 and the lead portion 114 of the negative electrode collector are connected by welding to each other through the opening of the insulating film. An insulating film 146 having an opening is disposed between the second outer surface of the negative electrode substrate exposed portion 140 and the receiving member 142 of the negative electrode collector. The negative electrode substrate exposed portion 140 and the receiving member 142 of the negative electrode collector are connected by welding to each other through the opening of the insulating film 146. The negative electrode collector is electrically insulated from the sealing plate 120 by a negative electrode side insulating member 52a.

The positive electrode terminal 130 and the negative electrode terminal 132 are each fixed to the sealing plate 120 with an insulating member interposed therebetween. In the secondary battery of this embodiment, a pressure-sensitive current breaking mechanism 200 is provided between the positive electrode and the positive electrode terminal 130.

The electrode assembly 110 is housed in a bottomed tubular battery case 100, with the periphery thereof except for the sealing plate 120 side covered by an insulating sheet 161 made of resin. The opening of the battery case 100 is sealed by the sealing plate 120. The sealing plate 120 is provided with an electrolyte pour hole 163. The electrolyte pour hole 163 is sealed by a sealing plug after the pouring of electrolyte. The sealing plate 3 is further provided with a gas release valve 162 that is opened when a pressure higher than the operating pressure of the current breaking mechanism 200 is applied thereto.

Next, the current breaking mechanism 200 will be described. The current breaking mechanism 200 may be provided either on the positive electrode side or on the negative electrode side. The following description will be given under an assumption that the current breaking mechanism 200 is provided only on the positive electrode side. The current breaking mechanism 200 functions by a mechanism in which a fragile portion provided in a part of the conduction route breaks owing to the deformation of a member in the vicinity of the fragile portion with the increase of the pressure in the battery case 100, and conduction is cut off.

Figure 5:
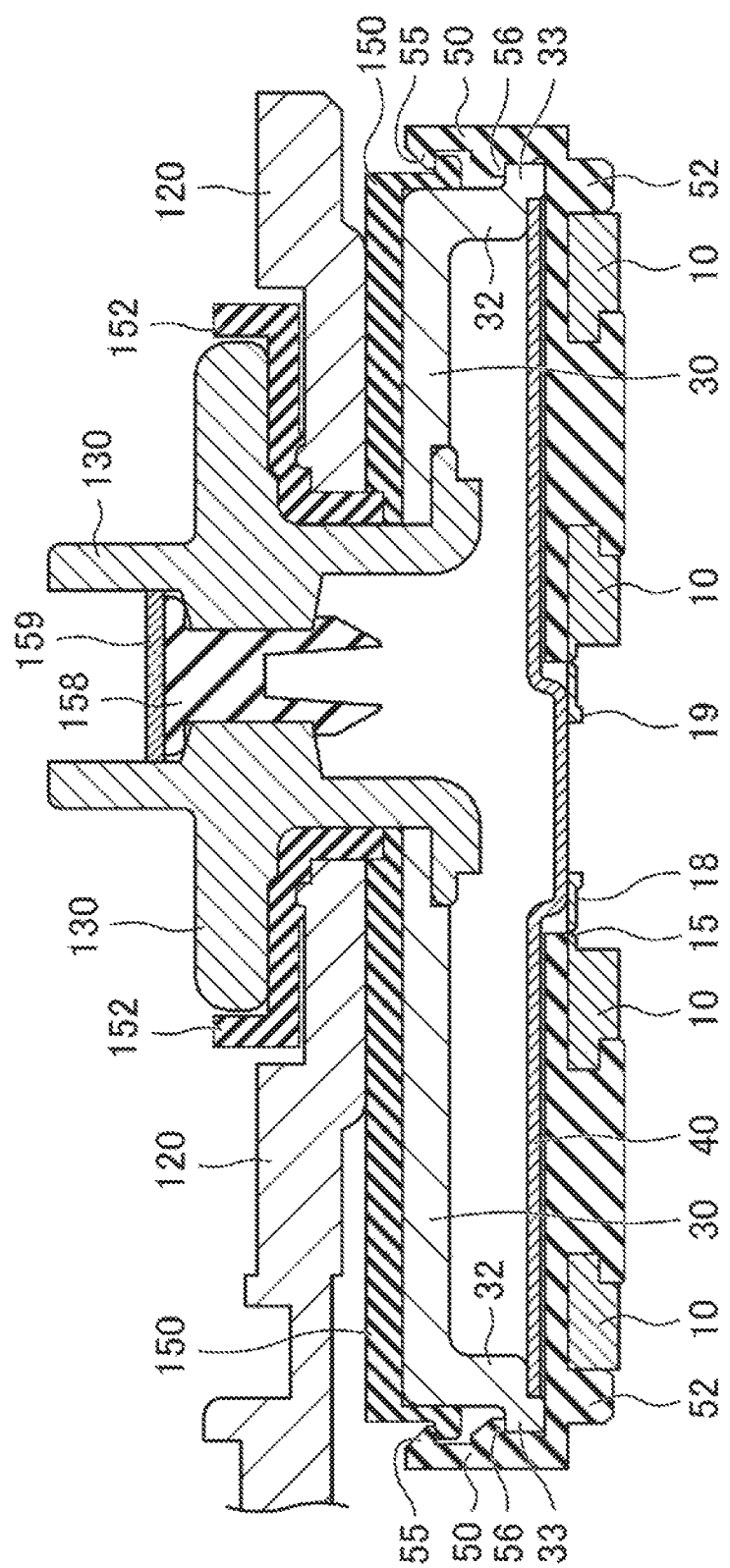
FIG. 5 is a schematic enlarged sectional view of the vicinity of the positive electrode terminal taken parallel to the front surface and along the center line of the top surface.
Figure 6:
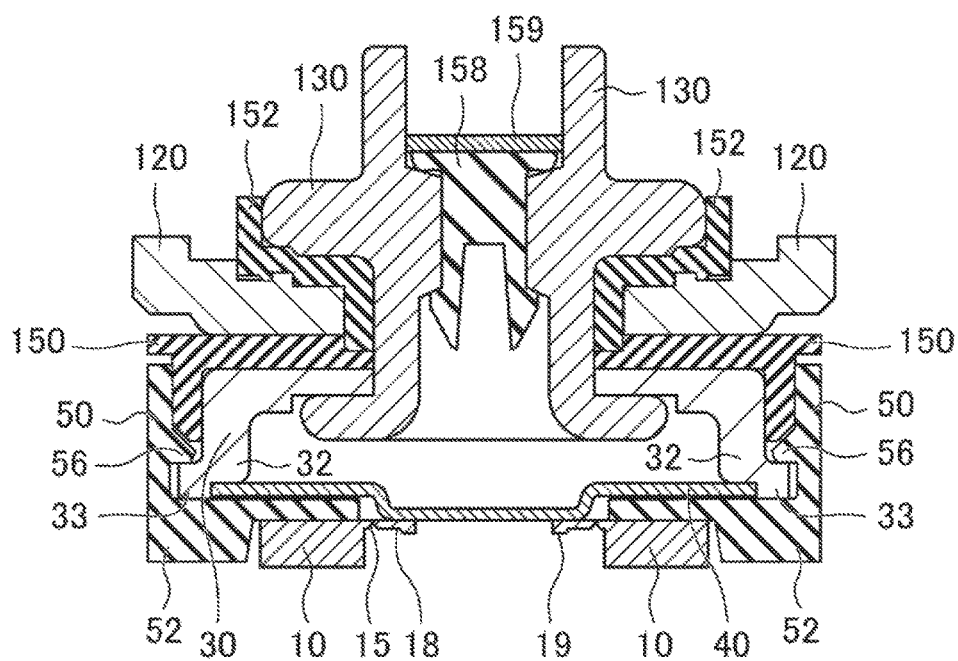
FIG. 6 is a schematic enlarged sectional view of the vicinity of the positive electrode terminal taken parallel to the side surface and along the center line of the positive electrode terminal.

As shown in FIGS. 5 and 6, the positive electrode terminal 130 has a through-hole formed therein. The positive electrode terminal 130 is inserted into through-holes formed in a terminal portion insulating member 152, the sealing plate 120, the second insulating member 150, and the conducting member 30, and the battery inside side end of the positive electrode terminal 130 is caulked so as to be pressed against the conducting member 30, and is fixed integrally therewith. Therefore, the positive electrode terminal 130 is electrically insulated from the sealing plate 120 by the terminal portion insulating member 152 and the second insulating member 150, and is electrically connected to the conducting member 30. Although not shown, in FIGS. 5 and 6, the electrode assembly is present on the opposite side of all the shown components from the sealing plate 120. The connection portion between the battery inside side end of the positive electrode terminal 130 and the conducting member 30 is preferably connected by welding such as laser welding. The through-hole formed in the positive electrode terminal 130 is sealed by a rubber terminal plug 158 that is provided with a metal plate 159 at the upper end thereof.

The second insulating member 150 is disposed between the sealing plate 120 and the conducting member 30, and insulates the sealing plate 120 and the conducting member 30 from each other. The conducting member 30 has a tubular portion 32 having a substantially rectangular cross-section on the electrode assembly 110 side thereof, and a connection portion disposed parallel to the sealing plate 120 is formed on the sealing plate 120 side thereof. The positive electrode terminal 130 is inserted into the through-hole provided in the conducting member 30.

The electrode assembly side opening of the tubular portion 32 of the conducting member 30 is sealed by a deforming plate 40. The edge of the tubular portion 32 of the conducting member 30 and the periphery of the deforming plate 40 are welded to each other. The deforming plate 40 is formed of an electrically conductive material such as aluminum, and has the function of a valve that deforms toward the sealing plate 120 (toward the outside of the battery) when the pressure in the battery case 100 increases and reaches a predetermined value. The positive electrode collector 10 is connected to the electrode assembly side surface of the deforming plate 40. Thus, the conduction route is formed, from the positive electrode of the electrode assembly, in the order of the positive electrode collector 10, the deforming plate 40, the conducting member 30, and the positive electrode terminal 130.

The first insulating member 50 is disposed between part of the deforming plate 40 other than the central part thereof and the positive electrode collector 10. The first insulating member 50 is provided with a through-hole in a part thereof corresponding to the central part of the deforming plate 40 where the deforming plate 40 and the positive electrode collector 10 are connected to each other. The first insulating member 50 and the second insulating member 150 are connected and fixed to each other by engagement. The fixing method is not particularly limited. Here fixation is performed in a latching manner using catch portions 55 formed on the first insulating member 50. This fixing portion is formed on the outer peripheral edge of the first insulating member 50.

As shown in FIG. 7, the positive electrode collector 10 has a base portion 12 that is disposed opposite the first insulating member 50 and parallel to the sealing plate 120, and a lead portion 14 that is bent from the base portion 12 and is electrically connected to the positive electrode substrate exposed portion 141. The base portion 12 is substantially rectangular, and the lead portion 14 extends from one of the long sides of the base portion 12. FIG. 7 shows a state before the lead portion 14 is bent along one of the long sides of the base portion 12. The positive electrode collector 10 is made by punching an aluminum plate.

The base portion 12 of the positive electrode collector 10 has a through-hole formed in the center thereof. As shown in FIGS. 5 and 7, two side through-holes are formed on both sides of the through-hole in the center of the base portion 12, and a semicircular cutout is formed in the outer peripheral part of the base portion 12 near the lead portion 14. The first insulating member 50 is provided with a through-hole that faces the through-hole provided in the center of the base portion 12 of the positive electrode collector 10, and on both sides thereof, protrusions are formed at positions corresponding to the two side through-holes provided in the base portion 12 of the base portion 12, and a protrusion is formed at a position corresponding to the semicircular cutout.

The protrusions of the first insulating member 50 are inserted into the side through-holes and cutout of the positive electrode collector 10, the tips of the protrusions are heated and increased in diameter, and the first insulating member 50 and the base portion 12 of the positive electrode collector 10 are thereby fixed to each other. The protrusions whose tips are increased in diameter become a first fixing portion 61 and a second fixing portion 62 that are fitted in the side through-holes, and a third fixing portion 63 that is fitted in the cutout.

As shown in FIG. 7, between the first fixing portion 61 and the second fixing portion 62, the base portion 12 of the positive electrode collector 10 is electrically connected to the deforming plate 40, and the third fixing portion 63 is disposed on the outer peripheral edge of the base portion 12 and near the lead portion 14. Owing to such a configuration, if the battery is subjected to shock due to vibration, falling, or the like, the electrode assembly 110 is moved, and the lead portion 14 of the positive electrode collector 10 is thereby pulled, the stress applied to the connection portion between the positive electrode collector 10 and the deforming plate 40 is suppressed more effectively on both sides of the connection portion. In addition, since the third fixing portion 63 is provided on the outer peripheral edge of the base portion 12 and near the lead portion 14, when the battery is subjected to shock due to vibration, falling, or the like, the electrode assembly 110 is moved, and the lead portion 14 of the positive electrode collector 10 is thereby pulled, the stress applied from the positive electrode collector 10 side is suppressed more effectively by the third fixing portion 63.

A thin region 18 thinner than other parts is provided around the through-hole in the center of the base portion 12 of the positive electrode collector 10. In the vicinity of the outer periphery of the thin region 18, an annular notch portion 15 is formed so as to surround the through-hole. The notch portion 15 is provided in a groove-like shape such that the thickness thereof is less than that of the thin region 18, and preferably has a V-shaped cross-section. The inner peripheral edge of the thin region 18 is provided with an inner peripheral rib portion 19. The inner peripheral rib portion 19 is laser-welded to the deforming plate 40 at a plurality of points, and the deforming plate 40 and the positive electrode collector 10 are thereby electrically connected to each other.

The operation of the current breaking mechanism 200 in this embodiment is as follows. When the pressure in the battery case 100 increases and reaches a predetermined value, the deforming plate 40 deforms toward the sealing plate 120 (toward the outside of the battery). Owing to that deformation, the notch portion 15 breaks over the entire circumference thereof, the electrical connection between the deforming plate 40 and the positive electrode collector 10 is cut off, and current is broken.

The first insulating member 50 is formed in a substantially rectangular shape in plan view slightly larger than the base portion 12 of the positive electrode collector 10 (a shape such that the corners of a rectangle are rounded or cut). A rib 52 is formed so as to surround the outer periphery of the base portion 12. As shown in FIG. 7, the rib 52 is not formed in a part in which the lead portion 14 extends. The rib 52 is formed so as to be thicker than part of the first insulating member 50 other than the rib 52 (except for the fixing portions 61, 62, and 63).

The first insulating member 50 is made of a material that is relatively soft and has a low Young's modulus of for example more than or equal to 200 MPa but not more than 1500 MPa, and preferably more than or equal to 300 MPa but not more than 600 MPa, such as perfluoroalkoxy alkane (PFA), polytetrafluoroethylene (PTFE), or ethylene tetrafluoroethylene (ETFE). Among them, PFA is preferable. The Young's moduluses were measured according to ASTM D638. Since the first insulating member 50 is relatively soft, the first insulating member 50 is easily fitted in the second insulating member 150, and is easily fixed in a latching manner.

The weight of the electrode assembly 110 is applied to the first insulating member 50 through the positive electrode collector 10. In this embodiment, the fixing portions 61, 62, and 63 which are fixing portions between the first insulating member 50 and the positive electrode collector 10 are located nearer to the connection portion between the deforming plate 40 and the positive electrode collector 10 than the engagement portions between the first insulating member 50 and the second insulating member 150 (catch portions 55), that is, the positions at which the upper side (sealing plate 120 side) of the first insulating member 50 is supported (support positions). A flange portion 33 is provided at the electrode assembly 110 side end of the conducting member 30. Catch portions 56 of the first insulating member 50 are connected to the flange portion 33, and the first insulating member 50 is supported on the sealing plate 120 side thereof.

Therefore, in the fixing portions 61, 62, and 63, moment due to the weight of the electrode assembly 110 acts downward about the sealing plate 120 side support positions of the first insulating member 50. Since the first insulating member 50 is made of a relatively soft material, owing to the above-described moment, the first insulating member 50 may deform so as to bend toward the electrode assembly 110. If the first insulating member 50 is deformed, the shapes of the fragile portions such as the thin region 18 and the notch portion 15 are changed, the connection portion between the deforming plate 40 and the positive electrode collector 10 is distorted, and the current breaking mechanism 200 may not normally operate when the pressure in the battery case 100 reaches the predetermined value. For example, when the deforming plate 40 is deformed, part of the notch 15 remains uncut, and current may not be broken. The current breaking mechanism 200 may operate before the pressure reaches the predetermined value or after the pressure exceeds the predetermined value, and the pressure at which operation is started may change.

In this embodiment, in order to prevent the current breaking mechanism 200 from not normally operating, the rib 52 is provided on the first insulating member 50 to improve the mechanical strength of the first insulating member 50. That is, the outer peripheral edge of the flat plate-like first insulating member 50 that is substantially rectangular in plan view is provided with the rib 52 that is a part thicker than the central part (protruding toward the electrode assembly) so that when the weight of the electrode assembly 110 is applied vertically downward to the fixing portions between the first insulating member 50 and the positive electrode collector 10, the first insulating member 50 does not deform.

The rib 52 is preferably formed so as to be as long as possible along the outer peripheral edge of the first insulating member 50 because the strength of the first insulating member 50 is improved. However, in this embodiment, since the lead portion 14 of the positive electrode collector 10 fixed to the first insulating member 50 is formed so as to extend beyond the area facing the first insulating member 50, the rib 52 is not formed in the part where the lead portion 14 crosses the outer peripheral edge of the first insulating member 50. Therefore, the rib 52 extends on both sides of the lead portion 14 along the outer peripheral edge of the first insulating member 50, and is formed on the entire outer peripheral edge of the first insulating member 50 except for the part where the lead portion 14 is present. Since the lead portion 14 is bent substantially perpendicularly to the first insulating member 50 after the positive electrode collector 10 is fixed to the first insulating member 50, after the lead portion 14 is bent, the lead portion 14 may not face the part of the first insulating member 50 where the rib 52 is not present.

The rib 52 can be provided on the entire outer peripheral edge of the first insulating member 50. In this case, a positive electrode collector 10 in which a lead portion 14 is bent with respect to a base portion 12 is used.

The length of the rib 52 along the outer peripheral edge of the first insulating member 50 is preferably 30% or more, more preferably 50% or more, and even more preferably 70% or more of the length of the outer peripheral edge of the first insulating member 50.

The deformation of the first insulating member 50 is likely to occur in the vicinity of the border between the base portion 12 and the lead portion 14 of the positive electrode collector 10. Therefore, it is preferable that a rib 52 that is linear in plan view be provided on each of one long side (side extending along the longitudinal direction of the sealing plate 120) and one short side (side extending along the lateral direction of the sealing plate 120) of the outer peripheral edge of the first insulating member 50 close to the border between the base portion 12 and the lead portion 14 of the positive electrode collector 10.

It is preferable that the width of the rib 52 formed along the long side of the outer peripheral edge of the first insulating member 50 (the width in a direction parallel to the sealing plate 120 and perpendicular to the long side) be greater than the width of the rib 52 formed along the short side of the outer peripheral edge of the first insulating member 50 (the width in a direction parallel to the sealing plate 120 and perpendicular to the short side).

In particular, when the electrode assembly 110 is increased in size and weight with the increase in secondary battery capacity, providing the rib 52 to improve the mechanical strength of the first insulating member 50 has a large effect. When the weight of the electrode assembly 110 is 100 g or more, and the thickness of part of the first insulating member 50 except for the rib 52 and the fixing portions 61, 62, and 63, that is, part sandwiched between the deforming plate 40 and the positive electrode collector 10 is 1.0 mm or less, the effect of the rib 52 for preventing the current breaking mechanism 200 from not normally operating is marked. The thickness of part of the first insulating member 50 that is sandwiched between the deforming plate 40 and the positive electrode collector 10 is preferably more than or equal to 0.2 mm but not more than 1.0 mm.

In the above-described embodiment, as a method by which the first insulating member 50 is supported on the sealing plate 120 side, an example is shown in which the first insulating member 50 is connected to the second insulating member 150, and the first insulating member 50 is connected to the conducting member 30. However, the method by which the first insulating member 50 is supported on the sealing plate 120 side is not particularly limited. The first insulating member 50 may be connected only to the second insulating member 150, or the first insulating member 50 may be connected only to the conducting member 30. The first insulating member 50 may be connected to the sealing plate 120.

However, it is more preferable that the first insulating member 50 be connected to the second insulating member 150, and the first insulating member 50 be connected to the conducting member 30. The first insulating member 50 is thereby more firmly supported on the sealing plate 120 side. It is preferable that, as shown in FIG. 5, the connection portion between the first insulating member 50 and the second insulating member 150 and the connection portion between the first insulating member 50 and the conducting member 30 be aligned in a direction perpendicular to the sealing plate 120. That is, it is preferable that the connection portion between the first insulating member 50 and the second insulating member 150 be disposed just above the connection portion between the first insulating member 50 and the conducting member 30.

Although, in the above-described embodiment, an example is shown in which three fixing portions between the positive electrode collector 10 and the first insulating member 50 are provided, it is only necessary that at least one fixing portion between the positive electrode collector 10 and the first insulating member 50 be provided. However, it is preferable that a fixing portion be provided on each side of the connection portion between the deforming plate 40 and the positive electrode collector 10.

Although an example is shown in which the positive electrode terminal 130 and the conducting member 30 are separate components, the positive electrode terminal 130 and the conducting member 30 can be integrated into a single component.

It is preferable that, as shown in FIG. 5, in the longitudinal direction of the sealing plate 120, the through-hole provided in the conducting member 30 into which the positive electrode terminal 130 is inserted be shifted from the center of the conducting member 30 to the side on which the lead portion 14 of the positive electrode collector 10 is disposed. In the case of such a configuration, the distance between a part where the sealing plate 120, the second insulating member 150, and the conducting member 30 are fixed together by the positive electrode terminal 130 and a part of the positive electrode collector 10 or the first insulating member 50 to which the weight of the electrode assembly is likely to be applied can be reduced. Therefore, bending or the like of each component can be more reliably prevented, and therefore this is more preferable.

Other Embodiments

The above-described embodiment is merely illustrative of the present invention, and the present invention is not limited to these examples. These examples may be combined or partially replaced with well-known art, commonly used art, or publicly known art. The present invention also includes modifications easily conceived by those skilled in the art.

The secondary battery of the present invention is applicable to both non-aqueous electrolyte secondary batteries and alkaline secondary batteries such as a nickel-hydrogen secondary battery. Although a predetermined operation effect is obtained as long as the deforming plate is connected to either the positive electrode collector or the negative electrode collector, the deforming plate may be connected to both.

The shape of the battery case is not limited to a rectangular parallelepiped shape (prismatic shape), and may be a bottomed cylindrical shape. The cross-sectional shape of the tubular portion of the conductive member is not limited to a rectangular shape, and may be a circular shape, an elliptical shape, or a polygonal shape.

The fragile portion of the current breaking mechanism where current is broken may be provided in at least one of the positive electrode collector and the negative electrode collector, in the deforming plate, or in the connection portion between the collector and the deforming plate. Alternatively, the collector and the deforming plate may be connected via a metal foil, and this metal foil may serve as the fragile portion. For example, a form is conceivable in which an opening is provided in the collector, a metal foil is connected to the collector so as to cover this opening, and the metal foil is connected also to the deforming plate. The fragile portion may be a thin portion thinner than the peripheral part, a cut or a notch, or a welded part (welding nugget).

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
    a bottomed tubular battery case having an opening;
    an electrode assembly housed in the battery case and including a positive electrode and a negative electrode;
    a positive electrode collector electrically connected to the positive electrode;
    a negative electrode collector electrically connected to the negative electrode;
    a sealing body sealing the opening of the battery case;
    an external terminal exposed to the outside in the sealing body;
    a conducting member located between the sealing body and the electrode assembly, electrically connected to the external terminal, and having a tubular portion;
    a deforming plate located between the conducting member and the electrode assembly, sealing the opening of the tubular portion, electrically connected to the conducting member, electrically connected to the positive electrode collector or the negative electrode collector, and deforming when the pressure in the battery case reaches a predetermined value and thereby breaking the electrical connection with the positive electrode collector or the negative electrode collector; and
    a first insulating member located between the deforming plate and the positive electrode collector or the negative electrode collector and supported on the sealing body side,
    wherein a conduction route is formed in the order of the electrode assembly, the positive electrode collector or the negative electrode collector, the deforming plate, the conducting member, and the external terminal,
    wherein the positive electrode collector or the negative electrode collector has a base portion facing the first insulating member, and a lead portion extending from an end of the base portion and connected to the electrode assembly,
    wherein at least one fixing portion fixing the base portion and the first insulating member to each other is provided in the first insulating member,
    wherein the at least one fixing portion is located nearer to the connection portion between the deforming plate and the positive electrode collector or the negative electrode collector than the sealing body side support position of the first insulating member, and
    wherein the outer peripheral edge of the electrode assembly side surface of the first insulating member is provided with a rib protruding to the electrode assembly side and extending along the outer peripheral edge of the base portion.

2. The secondary battery according to claim 1, wherein the first insulating member is made of a resin having a Young's modulus of 1500 MPa or less.

3. The secondary battery according to claim 1, wherein, in the first insulating member, the rib extends on both sides of the lead portion along the outer peripheral edge of the base portion.

4. The secondary battery according to claim 1,
    wherein the weight of the electrode assembly is 100 g or more, and
    wherein the thickness of a part of the first insulating member that is located between the deforming plate and the base portion is 1.0 mm or less.

5. The secondary battery according to claim 1, wherein the at least one fixing portion comprises at least three fixing portions.

6. The secondary battery according to claim 1,
    wherein the first insulating member has a first fixing portion, a second fixing portion, and a third fixing portion as the at least one fixing portion,
    wherein, between the first fixing portion and the second fixing portion, the base portion of the positive electrode collector or the negative electrode collector is electrically connected to the deforming plate, and
    wherein the third fixing portion is disposed on the outer peripheral edge of the base portion and in the vicinity of the lead portion.

7. The secondary battery according to claim 1,
    wherein the at least one fixing portion is at least one protrusion provided on the first insulating member, and
    wherein the at least one protrusion is fitted in at least one opening or cutout provided in the base portion of the positive electrode collector or the negative electrode collector, and the first insulating member and the positive electrode collector or the negative electrode collector are thereby fixed to each other.

8. The secondary battery according to claim 1,
    wherein a second insulating member is disposed between the sealing body and the tubular portion of the conducting member, and
    wherein the first insulating member and the second insulating member are connected to each other.

* * * * *